Jan. 26, 1960

D. E. RAUDABAUGH 2,922,928

CAPACITOR AND CIRCUIT BREAKER THEREFOR

Filed Oct. 5, 1956

INVENTOR.
DONALD E. RAUDABAUGH
BY

ATTORNEY.

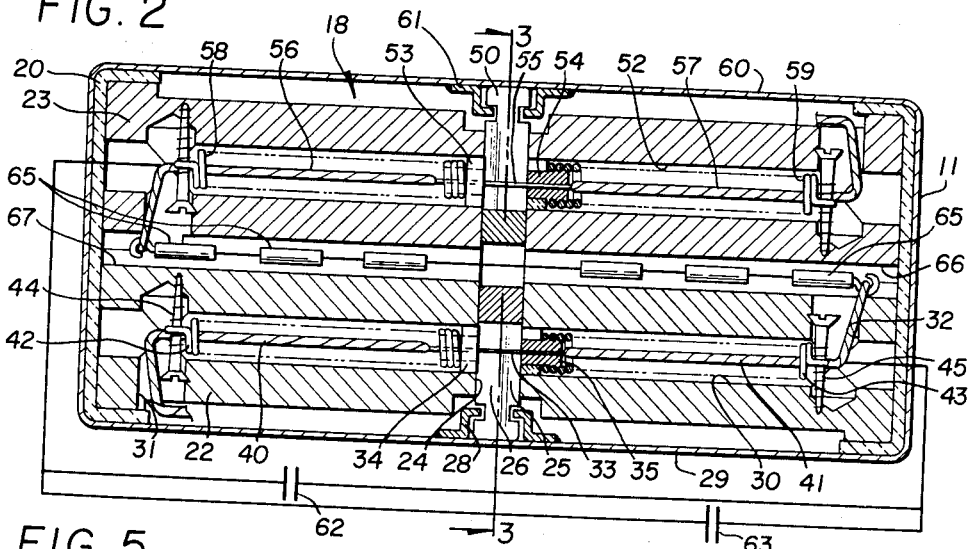
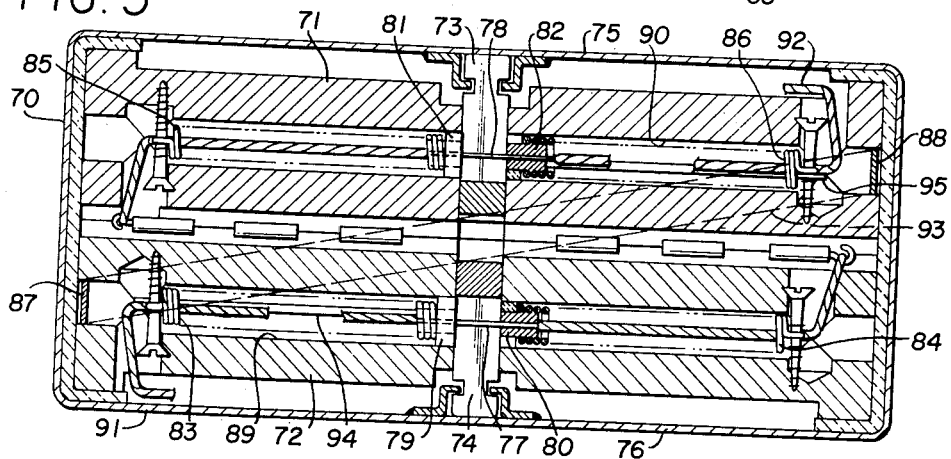
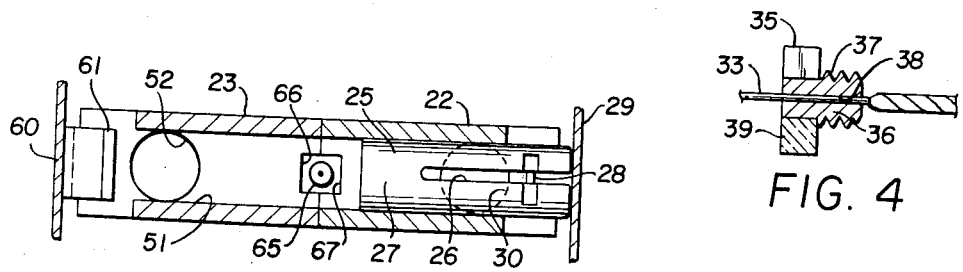
Jan. 26, 1960 — D. E. RAUDABAUGH — 2,922,928
CAPACITOR AND CIRCUIT BREAKER THEREFOR
Filed Oct. 5, 1956 — 2 Sheets-Sheet 2
INVENTOR.
DONALD E. RAUDABAUGH
BY
ATTORNEY.

United States Patent Office 2,922,928
Patented Jan. 26, 1960

2,922,928
CAPACITOR AND CIRCUIT BREAKER THEREFOR

Donald E. Raudabaugh, Mansfield, Ohio, assignor to The Ohio Brass Company, Mansfield, Ohio, a corporation of New Jersey Application October 5, 1956, Serial No. 614,174

17 Claims. (Cl. 317—12)

This invention relates to the capacitor art and more generally to the electric circuit breaker and electric container apparatus arts.

In the utilization of electric power capacitors for power factor and load control in electric power transmission and distribution lines, the capacitor elements are ordinarily incorporated in a container or housing which is mounted in a station or on a line pole at the appropriate location in the circuit. Such capacitors are required to operate for long periods of time without attention and must maintain the desired impedance characteristics under a wide variety of electrical and other operating conditions. If, in the course of such operation, a number of the capacitor elements of the power capacitor should fail, the fact of such failure would either become evident by reason of the malfunctioning of the line to which the power capacitor was connected, or, the excessive current through the capacitor would cause the operation of the fuse ordinarily associated with the power capacitor as a circuit interruption means.

When, however, a single capacitor element fails in a container having several of such elements in series, the excessive current, due to the defective element, may be only a few percent greater than the current which the power capacitor is designed to accommodate. Under such conditions there is no way of detecting the excessive current flow by ordinary methods and the excessive current is not sufficient to activate the fuse. Consequently, the flow of current in the defective capacitor element causes the evolution of gases resulting from arcing within the capacitor element and the gases accumulate until the container explodes. As a result, not only the unfailed capacitor elements in the container are destroyed, but adjacent equipment may be damaged and electrical service interrupted.

The present invention is concerned with the provision of a remedy for the aforesaid difficulty and particularly contemplates the utilization of an increase in the pressure within the container incorporating a failed capacitor element to interrupt the connection from the capacitor to the external circuits.

More specifically, there is provided an arrangement in which the outward expansion of the container walls, brought about by the increase in internal pressure due to the evolution of the gases, operates a mechanism to shear a wire link which forms the electrical connection between the capacitor element and the capacitor bushing and the external circuit. The link also restrains a spring arrangement which, upon release, modifies the several electrical connections. The arrangement shown and disclosed herein is particularly advantageous in that the large area of the container wall, when acted upon by even relatively small increases in the pressure of the internal medium of the capacitor, will produce sufficient mechanical forces to operate the breaker arrangement.

Accordingly, a principal object of the invention is to automatically disconnect power capacitors from transmission lines and the link upon failure of a capacitor element therein.

Another object of the invention is the provision of a circuit breaker for capacitors and the link which is responsive to and operable by an increase in the pressure of the internal medium within the container.

Another object of the invention is to provide a specific construction of a circuit breaker or interruption apparatus which is adapted to operate in response to changes in the pressure of the internal medium of an electrical apparatus container, and which is operable to interrupt circuits having relatively high voltages.

Still another object of the invention is to provide a capacitor adapted for use in series connected banks and in which the capacitor is shorted following the failure of a capacitor element and a consequent increase in the pressure within the capacitor.

The invention, together with further objects, features and advantages thereof will be more clearly evident from consideration of the following detailed specification and claims taken in connection with the appended drawings, in which Fig. 1 is a front elevation view of an electric power capacitor with a portion of the side of the container broken away to show a portion of the circuit breaker apparatus of the invention;

Fig. 2 is a section view taken in the direction 2—2 in Fig. 1 illustrating particularly the circuit breaker of the invention;

Fig. 3 is a section view taken in the direction 3—3 in Fig. 2;

Fig. 4 is an enlarged sectional view of the link support; and

Fig. 5 is a section view similar to that of Fig. 2 illustrating an alternate embodiment of the invention.

Figure 1:
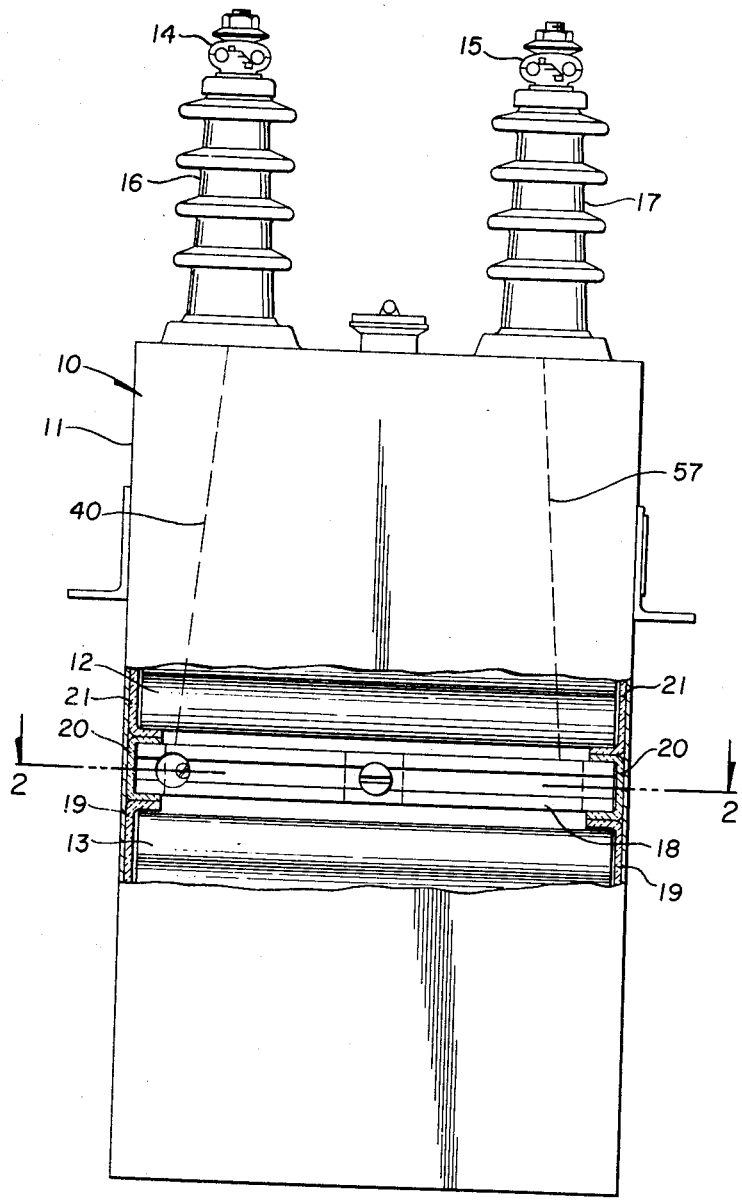

Referring now to Fig. 1, there is shown a capacitor 10 adapted for use with electric power circuits. The capacitor 10 comprises a sheet metal container 11 having a plurality of capacitor elements, such as the elements 12 and 13, internally connected to the terminals 14 and 15 of two bushings 16 and 17. The container 11 and the bushings 16 and 17 are gas tight and the interior of the container is filled with a liquid dielectric medium such chlorinated diphenyl.

The breaker apparatus of the invention, designated generally at 18, is supported by the lower capacitor elements 13, and in turn supports the upper capacitor elements 12. The capacitor elements and the breaker apparatus 18 are insulated from the walls of the container by means of insulating board, such as the pieces 19 disposed about the lower capacitor elements, the pieces 20 disposed about the breaker apparatus 18, and the pieces 21 disposed about the upper capacitor elements 12. The insulating board provides an additional measure of electrical insulation between the apparatus and acts as a filler and generally as a restraining means for the capacitor elements and breaker apparatus.

The organization and construction of the breaker apparatus 18 of the invention will be more evident from the views of Figs. 2 and 3. The breaker apparatus comprises two circuit breakers formed by two rectangular wooden blocks or body members 22 and 23 which have their ends received between the insulating board pieces 20. The wooden blocks 22 and 23 are of identical construction and assembled in opposed relationship.

The block 22 of the first circuit breaker has an opening 24 transversely through the center of the block with a circular pin or movable member 25 received therein. The pin 25 has a horizontal groove 26 extending from a solid back portion 27 to the front of the pin and the forward parts of the pin are notched to receive the inwardly extending portions of the flanges 28 which are welded to the front side wall 29 of the container. An opening 30 extends longitudinally through the block 22 and intersects the opening 24 while two openings 31 and 32 extend from the front and back of the block respectively to intersect the longitudinal opening 30 near the ends of the block.

A wire link 33 extends transversely through the slot 26 in the pin 25 and into the opening 30 at each side of the pin. The link is held by two members 34 and 35 which are arranged to slide in the opening 30 and function as a supporting means for the link. Each of the members 34 and 35 comprises, as is shown in Fig. 4 for the member 35, an elongated metallic piece 36 having threads 37 at its outer end and a longitudinal opening 38 for receiving the link 33. An annular piece 39 of rigid insulating material is fitted over the inner end of the metallic piece 36 and suitably fixed thereto and contacts the interior surface of the opening 30 to maintain the orientation of the member 35 with respect to the block 22 while permitting the member to slide along the opening. The link 33 has two conductor wires 40 and 41 soldered or brazed to the link adjacent the members 34 and 35 and in such proximity to the pieces that the inner extremities of the pieces are maintained closely adjacent to the sides of the pin 25. The members 34 and 35 thus insure that a shearing action takes place upon movement of the pin 25 and that the link 33 is severed rather than simply stretched or bent.

Two springs 42 and 43 are threaded on the outer ends of the pieces 34 and 35 and held under tension by two screws 44 and 45 which are positioned in the openings 31 and 32.

The inner extremity of the slot 26, e.g. adjacent the solid part 27 of the pin 25, is spaced from the link 33 in order to accommodate movement of the walls of the container resulting from thermal expansion of the dielectric liquid. Excessive heating will, of course, produce sufficient movement to shear the link and disconnect the capacitor elements.

The second circuit breaker is similar to the first circuit breaker and has a pin 50 received in a transverse opening 51 in the block 23. The opening 51 is intersected by a longitudinal opening 52, similar to the opening 30, and carries two members 53 and 54 for holding the link 55. The link 55 is attached to two conductor wires 56 and 57 which restrain the members 53 and 54 against the springs 58 and 59. The pin 50 is connected to the back side wall 60 of the container 11 by flanges 61 and the breaker is actuated by movement of the rear wall of the container.

The capacitor elements are connected to the terminals 14 and 15 of the capacitor 10 through the breaker apparatus so that the links 33 and 55 are in series with the leads to the terminals. Thus, in Fig. 2 the capacitor elements above and below the breaker apparatus 18 in Fig. 1 are represented schematically as capacitors 62 and 63. The capacitor elements are connected to the conductor wires 41 and 56, while the conductor wires at the opposite sides of the links, e.g. conductor wires 40 and 57, are connected to the terminals 14 and 15. The capacitor elements 12 and 13 are, of course, suitably interconnected by leads or other conductors inter-connecting the foils at the ends of the elements.

A plurality of discharge resistors 65 are arranged in two grooves 66 and 67 in the back parts of the two blocks 22 and 23 and are connected to the conductor wires 41 and 56 and thence to the capacitor elements 12 and 13.

In operation, increase of the gas pressure within the container 11 causes the middle parts of the walls of the container to bow outward, thus causing a relative outward movement with respect to the blocks 22 and 23 which are held at the ends by the container. The pin 25 moves outwardly in the block 23 causing the solid portion 27 of the pin 25 to engage and shear the link 33, thus breaking the circuit from the capacitor elements to the conductor wire 40 and the terminal 14. The corresponding movement of the pin 50 in the block 23 shears the link 55, thus interrupting the circuit from the capacitor elements to the conductor wire 57 and to the terminal 15. The discharge resistors then drain any remaining charge on the several capacitor elements.

The operation referred to above is predicated upon the generation of gas within the container 11 as a result of the failure of one or more of the capacitor elements and the consequent arcing and evolution of gaseous ionization products from the dielectric material, e.g. from the dielectric liquid and the paper of the capacitor element. However, the breaker apparatus of the invention is arranged also to cause a similar circuit interruption in the event of heavy current overloads such as might be produced by a short between the terminals 14 and 15 of the capacitor. Accordingly, the links 33 and 55 may be formed of ordinary fuse wire of such a material and cross-section that the link will melt and permit the spring to retract the holding pieces, e.g. the members 34 and 35, to interrupt the circuit.

Referring now to Fig. 5, there is shown an alternate embodiment of the capacitor and breaker apparatus useful for practising the invention in connection with series capacitor installations, having few or no parallel capacitor units. The arrangement of Fig. 5 is substantially similar to that of Fig. 2 and two circuit breakers are provided within the container 70 comprising two fixed blocks 71 and 72 with pins or movable members 73 and 74 operatively connected to the rear and front walls 75 and 76 of the container 70 respectively. Two links 77 and 78 are provided respectively with associated supporting members 79 and 80 and 81 and 82 and springs 83 and 84 and 85 and 86, also respectively.

In accordance with the alternate embodiment of the invention, there is provided apparatus for forming a shunt connection across the terminals 14 and 15 upon operation of the two breakers. To this end, two metallic contact plates 87 and 88 are provided at the ends of the longitudinal openings 89 and 90 and adjacent the support members 79 and 82 which are connected to the terminals 14 and 15, e.g. by conductor wires 91 and 92. The contact plates 87 and 88 are connected by means of a metallic strip, shown in dotted outline at 93, which extends under the blocks 71 and 72 of the breaker apparatus.

Two metallic bars 94 and 95 are arranged within the springs 83 and 86 respectively, the inner ends of the bars abutting the metallic center pieces of the members 79 and 82, while the outer ends are spaced from the contact plates 87 and 88. The arrangement is such that, when the pieces 79 and 82 are retracted by reason either of the shearing or the fusing of the links, the bars 94 and 95 are forced lengthwise by the springs 83 and 86 to engage the contact plates 87 and 88. The conductor wires 91 and 92 are thereby connected to form a closed circuit across the terminals 14 and 15.

The ends of the bars 94 and 95 may preferably be brazed to the ends of the metallic center pieces of the members 79 and 82 corresponding to the piece 36 in Figs. 2 and 4.

It is to be understood that the foregoing description is not intended to restrict the scope of the invention and that various rearrangements of the parts and modifications of the design may be resorted to, giving effect to a liberal interpretation to the claims as herein set forth.

I claim:

1. Electrical apparatus comprising a gas tight container, an electrical element in the container, terminal means with insulating means supporting the terminal means from the container, conductor means connecting the electrical element to the terminal means and circuit breaker means comprising a body member fixed within the container and movable means carried by the said body member with means connected to the said conductor means for modifying the connection from the electrical element to the terminal means, and means operatively connecting the said movable means to a side wall of the container for actuating the circuit breaker means upon outward movement of the wall of the container in response to increase in gas pressure within the container.

2. Electrical apparatus comprising a gas tight container, an electrical element in the container, terminal means with insulating means supporting the terminal means from the container, conductor means connecting the electrical element to the terminal means and circuit breaker means comprising a body member fixed within the container, movable means carried by the body member and a conductive link extending transversely of the movable member and connected in series with the said conductor means and the said electrical element for interrupting the connection from the electrical element to the terminal means, and means operatively connecting the said movable means to a side wall of the container for shearing the said link upon outward movement of the wall of the container in response to increase in gas pressure within the container.

3. The invention in accordance with claim 2 in which the said link is formed of fusible material for interrupting the connection from the electrical element to the terminal means upon the occurrence of a sufficient overcurrent in the said conductor means.

4. A capacitor comprising a gas tight container, terminal means insulated from the container, a capacitor element in the container and circuit breaker means comprising a rigid member fixed within the container and a movable member carried by the fixed member, a link extending transversely of the movable member with means carried by the fixed member for holding the link adjacent the movable member upon movement thereof to shear the link, and spring means for retracting the link holding means, a plurality of conductors extending from the capacitor element to the link and to the terminal means to form a circuit therewith and means operatively connecting the movable member to a side wall of the container for shearing the link to modify the said circuit upon increase in pressure of the atmosphere within the container and outward movement of the wall of the container resulting therefrom.

5. A capacitor comprising a gas tight container, a terminal insulated from the container, a capacitor element in the container and circuit breaker means comprising a rigid member fixed within the container and a movable member carried by the fixed member, a link extending transversely of the movable member with means carried by the rigid member for holding the link adjacent the movable member upon movement thereof to shear the link and spring means for retracting the link holding means, a plurality of conductors extending from the capacitor element to the link and from the link to the terminal to form a series circuit with the link and means operatively connecting the movable member to a side wall of the container for shearing the link to interrupt the said circuit upon increase in pressure of the atmosphere within the container and outward movement of the wall of the container resulting therefrom.

6. The invention in accordance with claim 5 in which the said link is formed of fusible material for interrupting the connection from the electrical element to the terminal means upon the occurrence of a sufficient overcurrent in the said series circuit.

7. A capacitor comprising a gas tight container, two terminals for the capacitor, a capacitor element in the container and circuit breaker means comprising a rigid member fixed within the container and a movable member carried by the fixed member, a link extending transversely of the movable member with means carried by the rigid member for holding the link adjacent the movable member upon movement thereof to shear the link and spring means for retracting the link holding means, a contact plate and contact means carried by the spring means for engagement with the said contact plate upon retraction of the link supporting means, a connection from the terminal to the link and from the link to the capacitor element and means connecting the contact plate to the remaining terminal, and means operatively connecting the movable member to a side wall of the container for shearing the link to open the circuit to the capacitor element and shunt the terminals upon increase of pressure of the atmosphere within the container and outward movement of the wall of the container resulting therefrom.

8. That capacitor arrangement which comprises a metallic container, a first group of capacitor elements horizontally disposed upon and supported by the bottom of the container, a circuit breaker resting upon and supported by the said first group of capacitor elements and comprising an elongated block of insulating material with a transverse opening extending into the block from the side thereof and a longitudinal opening intersecting the transverse opening, a movable pin received in the transverse opening for sliding movement with respect to the elongated block, a conductive link extending through the pin with supporting means for holding the link disposed adjacent the pin and movable in the longitudinal opening, spring means in the opening attached to the supporting means and tensively supported by the elongated block for retracting the supporting means, means operatively connecting the pin to a side wall of the container comprising two step-like pieces attached to the wall of the container with vertically disposed grooves in either side of the pin and inwardly extending portions of the pieces received in the grooves, all for shearing the conductive link upon outward movement of the center part of the wall of the container, a second group of capacitor elements stacked upon and supported by the elongated block of the circuit breaker means, a terminal at the top of the said container and conductors extending from the terminal to the conductive link and from the conductive link to the capacitor elements.

9. The invention in accordance with claim 8 and including a second similar circuit breaker means with the block thereof disposed in back to back relationship to the block of the first circuit breaker means and the movable pin thereof similarly connected to the second side wall of the container, a second terminal and conductors extending from the second terminal to the conductive link of the second circuit breaker means and from the conductive link of the second circuit breaker means to the capacitor elements.

10. The invention in accordance with claim 9 and including longitudinal grooves in the adjacent sides of the elongated blocks, a plurality of discharge resistors disposed in the said grooves, connections from the discharge resistors to the said capacitors.

11. The invention in accordance with claim 9, wherein the supporting means connected to the terminals have conductive bars attached thereto and extending along the associated spring means, contact members spaced from the ends of the bars and a connection between the contact members, all for interconnecting the terminals and shunting the capacitor upon actuation of the circuit breakers.

12. The invention in accordance with claim 9, in which the link is received in a longitudinal slot in the pin and the end of the slot is spaced from the link to accommodate thermal movement of the walls of the container.

13. Combined electrical container apparatus and circuit breaker means comprising an elongated container having a substantially rectangular horizontal cross section, a rigid block of insulating material horizontally disposed in the container with the ends thereof transversely restrained by the ends of the container, a transverse opening in the block, a movable member arranged to slide in the transverse opening and means operatively connecting the movable member to the mid part of a side wall of the container whereby bowing movement of the side wall causes movement of the movable member with respect to the block, a shear member extending across the movable member and support means therefor carried by the block for holding the shear member upon relative movement of the movable member to sever the shear member, and spring means tensively connected to the support means at one end thereof and to the block at the other end for separating the portions of the shear member upon severance thereof.

14. The invention in accordance with claim 13, in which the said shear member is connected to the apparatus within the container and forms a circuit therewith whereby severance of the member and separation of the parts thereof interrupts the circuit.

15. The invention in accordance with claim 13, in which the support means for the shear member is engaged with a movable contact member having a second contact member associated therewith and severance of the shear member releases the spring to modify the relation of the two contact members.

16. Circuit breaker apparatus comprising a rigid block of insulating material having intersecting transverse and longitudinal openings therein, a movable member in the transverse opening and a link extending across the movable member with support means for the link in the longitudinal opening and abutting the movable member, a spring tensively connected to the support means at one end thereof and supported by the block at the other end thereof and restrained by the link, and engaging means on the link and support means for preventing relative movement thereof, and electrical conductor means connected to the link at the ends thereof whereby movement of the movable member relative to the block severs the link and interrupts the circuit formed thereby.

17. Circuit breaker apparatus comprising a rigid block of insulating material having intersecting transverse and longitudinal openings therein, a movable member in the transverse opening and a link extending across the movable member with support means for the link in the longitudinal opening and abutting the movable member, a spring tensively connected to the support means at one end thereof and supported by the block at the other end thereof and restrained by the link and engaging means on the link and support means for preventing relative movement thereof, and separate electrical contact means carried by the block and by the link support means whereby movement of the movable member severs the link and releases the spring to modify the relation of the contact means.

References Cited in the file of this patent

UNITED STATES PATENTS

| | | |
|---|---|---|
| 1,543,654 | Collidge | June 23, 1925 |
| 1,670,697 | Treanor | May 22, 1928 |
| 2,021,454 | Levin | Nov. 19, 1935 |
| 2,351,969 | Hurst | June 20, 1944 |